United States Patent [19]
Davis et al.

[11] Patent Number: 6,128,551
[45] Date of Patent: Oct. 3, 2000

[54] METHOD AND APPARATUS FOR MANAGEMENT OF AUTOMATED FUEL DELIVERY SYSTEM

[75] Inventors: Keith Davis; Wenyi Lu, both of San Antonio, Tex.

[73] Assignee: Megatronics International Corp., San Antonio, Tex.

[21] Appl. No.: 09/109,424

[22] Filed: Jul. 2, 1998

[51] Int. Cl.[7] .................................................. G06F 17/00
[52] U.S. Cl. .......................................... 700/236; 700/241
[58] Field of Search .................................. 700/236, 241, 700/244, 231, 232

[56] References Cited

U.S. PATENT DOCUMENTS

| | | | |
|---|---|---|---|
| 4,085,313 | 4/1978 | Van Ness | 235/419 |
| 4,360,877 | 11/1982 | Langston et al. | 364/465 |
| 4,550,859 | 11/1985 | Dow, Jr. et al. | 222/26 |
| 4,658,371 | 4/1987 | Walsh et al. | 364/550 |
| 4,900,906 | 2/1990 | Pusic | 235/381 |
| 5,027,282 | 6/1991 | Holidge | 364/479 |
| 5,299,135 | 3/1994 | Lieto et al. | 364/479 |
| 5,319,545 | 6/1994 | McGarvey et al. | 364/403 |
| 5,400,253 | 3/1995 | O'Connor | 364/442 |
| 5,596,501 | 1/1997 | Comer et al. | 364/464.23 |
| 5,694,326 | 12/1997 | Warn et al. | 364/479.01 |
| 5,757,664 | 5/1998 | Rogers et al. | 364/509 |
| 5,798,931 | 8/1998 | Kaehler | 364/479.01 |
| 5,889,676 | 3/1999 | Kubo et al. | 364/479.01 |
| 5,980,090 | 11/1999 | Royal, Jr. et al. | 364/479.11 |

*Primary Examiner*—Christopher P. Ellis
*Assistant Examiner*—Khoi H Tran
*Attorney, Agent, or Firm*—Cox & Smith Incorporated

[57] ABSTRACT

A system for monitoring and delivering fuel to vehicles, consisting of at least three levels of control and data storage. Each vehicle using the system has a key that stores transactional data and data concerning the vehicle and its fuel requirements, which key is received by a fuel delivery control device associated with a fuel pump. The control device may independently validate and authorize fuel transactions upon receipt of such key, and may maintain and transfer transactional and key parameter data. A central control unit gathers transactional data from any number of control devices and communicates updated information to the devices to facilitate their independent operation. A fourth level of control and data storage may be provided with a telecommunications link between a number of central control units and a master management system. Operational algorithms within each component of the system permit their independent operation and provide alternative means for transferring data when communication between components fails. Additionally, transfer keys are provided for transferring data from control devices to central control units and vice versa. Finally, fuel storage tank sensors communicate data to the central control unit concerning fuel levels, thereby allowing for fuel inventory management and the detection of environmental leaks.

5 Claims, 6 Drawing Sheets

METHOD AND APPARATUS FOR MANAGEMENT OF AUTOMATED FUEL DELIVERY SYSTEM

BACKGROUND OF THE INVENTION

1. Field of the Invention

The present invention relates generally to methods and devices for the automatic delivery of fuel to motor vehicles. The present invention relates more specifically to improved methods and devices for the control, management and accounting of fuel delivery to motor vehicles.

2. Description of the Related Art

A number of systems currently exist that permit controlled delivery of fuel to fleets of vehicles operated by a single business or organization. Whether that business or organization maintains its own fueling depot, or contracts for and utilizes the services of an independent fueling depot, it is necessary to accurately track, control, and manage the use of fuel for the efficient operation of the business. Most systems currently in use incorporate certain basic elements that permit the operator of the vehicle to select and dispense fuel into the vehicle in a manner that provides an accounting and billing to the vehicle's owner and the operator's employer.

Most automated fuel delivery systems currently in use incorporate three general levels of components. These levels include: (1) a portable memory device typically carried with the vehicle or in the possession of the vehicle's operator, (2) a fuel delivery control device positioned at the fuel pump and capable of receiving the memory device from the vehicle's operator in order initiate the delivery of fuel, and (3) a central control unit connected in some manner to a number of fuel delivery control devices and capable of receiving information from these devices about the fueling transactions. In some instances, there is a fourth level of operation connected by way of a communications link (such as a telephone line) to a centralized management system that might communicate with and control a number of central control units.

In any case, the goals of such systems include: (a) the controlled delivery of fuel in appropriate amounts to only the appropriate vehicles associated with the company; (b) the accounting of fuel delivery amounts for the purposes of billing and/or expensing such costs; and (c) managing fuel usage in order to identify and resolve problems with vehicles and/or vehicle operators.

There are in addition other existing systems associated with such fuel delivery systems that monitor and control the level of fuel in the storage tanks that supply the delivery systems. While there are many devices on the market designed to monitor and alert fuel depot operators to the level of fuel within fuel storage tanks, very few such systems are fully integrated into the automated fuel delivery systems that control the operation of the fuel pumps. Typically, such fuel storage tank monitors operate on systems independent from the fuel delivery control systems.

The most basic systems in the field described above utilize credit card type devices that are carried by the vehicle's operators and which prompt the delivery of fuel when inserted into the control devices associated with each fueling station. In most cases, these fuel delivery control devices are positioned one for each fueling island and serve to activate or deactivate a number of fuel pumps positioned on the fueling island. The vehicle operator would typically insert or slide the magnetic card through a card reader on the control device in order to activate fuel delivery. The control device may require that additional information be input by way of a keypad or similar feature. The device then verifies the validity of the information contained on the magnetic card and then activates the flow of the fuel to the vehicle.

As indicated above, such fuel delivery control devices are typically linked to a central control unit positioned within an office or building associated with the fueling depot. This communication link is typically a hard wire line although in some instances, radio telemetry links are utilized. The fuel control device will communicate various types of information about the vehicle and operator attempting to obtain fuel and will receive some verification from the central controller to validate the transaction. In addition, information associated with the completed transaction is communicated back from the control device to the central control processor. In this manner, a centralized record of the fueling transaction is maintained. This is in addition to the centralized control of the activation of the fuel delivery systems.

Examples of various patents in the field associated with the present invention include the following:

U.S. Pat. No. 5,027,282 issued to Hollidge on Jun. 25, 1991, entitled Interactive Pump System. This patent describes a system capable of interacting with and responding to prompts from a vehicle operator. The system includes a pump, a central processing unit connected to the pump and a display and input device. The central processing unit receives input from the vehicle operator and controls the pump according to these inputs.

U.S. Pat. No. 5,596,501 issued to Comer, et al. on Jan. 21, 1997 entitled System for Dispensing Fuel at Remote Locations, and Method of Operating Same. This patent describes a system that includes an operations control center and a number of remotely located fuel dispensing modules in wireless communication with the control center. The control center processes information related to the dispensing of fuel and authorizes the dispensing of fuel upon receipt of appropriate payment information. The structure of the system is such that it may operate independently of external connections to electrical power and the like.

U.S. Pat. No. 5,299,135 issued to Lieto, et al. on Mar. 29, 1994, entitled Direct Interface between a Fuel Pump and Computer Cash/Register. The interface unit described in this patent includes a controller and a variety of communication links between the controller and fuel dispensing devices.

U.S. Pat. No. 4,900,906 issued to Pusic on Feb. 13, 1990 entitled Automated Fuel Pump Controlling System. This patent describes a system that includes a magnetic card reading device to read and verify payment for the delivery of fuel. The patent also describes elements that permit the user of the magnetic card to enter further required information to verify and control the delivery of fuel. The system anticipates multiple devices, each capable of operating independently for controlling the tasks to be performed in the process of delivering fuel.

U.S. Pat. No. 4,550,859 issued to Dow, Jr., et al. on Nov. 5, 1985, entitled Micro-processor Control Fluid Dispensing System. This patent describes an automated system for controlling and monitoring an array of fluid dispensing pumps. The system incorporates a control panel or console that displays such information as price per gallon, transaction limits, pump enablement, pump identity and status, dispensed fuel values, dispensed fuel volume and other display controls. The micro-processor is connected to console equipment for maintenance of appropriate records on the delivery of fuel.

U.S. Pat. No. 4,658,371 issued to Walsh, et al. on Apr. 14, 1987, entitled Fuel Dispensing and Vehicle Maintenance System with Onboard Computer. This system incorporates additional features and devices maintained on the vehicle itself that permit the automatic updating of information within the fuel control system about the vehicle's condition and fuel needs. The communication of this information from the device on the vehicle to the device at the fueling station is by way of a magnetic transfer key. Various limits are identified within the information to alert the vehicle operator of the need for vehicle maintenance or an inappropriate fuel delivery request.

U.S. Pat. No. 4,360,877 issued to Langston, et al. on Nov. 23, 1982, entitled Distributed Data Processing System and Method for a Fluid Dispenser. This patent describes an improved control system that uses a central console control to supervise and monitor the dispensing operation of a number of independent dispensers. The system anticipates the independent operation of the dispensers apart from the console in the event of its failure or in the event of desired manual operation.

U.S. Pat. No. 5,694,326 issued to Warn, et al. on Dec. 2, 1997 entitled Fuel Pump-Card Reader Control Center. The system described in this patent is the basic debit/credit card reader positioned at each of a plurality of fuel dispensing pumps at a fuel depot. This system anticipates a centralized fuel pump/card reader control center connected to a network of data processing devices which are themselves connected by remote communication to a central office.

Various problems exist with each of the systems that are currently in use in this field. Since each system relies upon the accurate communication of verification data and transaction data between the various components in the system, each is subject to failure when the communication links between the components fail. In other words, many systems rely upon the validation of a transaction and the recording of transactional data at a central control site remote from the fueling pump itself. Because of this, the failure of the communication link between the central control site and the fueling pump will necessarily require deactivation of the delivery system as a whole. In addition, many such systems control a number of fuel pumps through a single fuel island controller which results in the deactivation of an entire fuel island when the communication link between the controller and the central control site fails.

Beyond the problems associated with intrasystem communications, there are also a number of problems associated with the maintenance of databases that are used to operate these fuel delivery systems and the updating of information in these databases on a timely basis. These database problems complicate the system's ability to overcome the failure of a communication link between components in the system. One solution to overcoming communication link problems is instilling within each component of the system the ability to independently verify the validity of a transaction and to maintain transactional data. The problem that then arises is that even if each component has the capability of storing the information necessary to validate a transaction and retain transaction data, it is imperative for that information to be readily available at remote fueling sites to prevent duplicate or repetitive fueling in violation of the system's controls. In other words, the current systems cannot typically handle situations where, when communication links fail, a vehicle operator tries to fuel a number of different vehicles with a single, apparently appropriate, magnetic card or key.

There are many additional problems associated with the failure of the typically weak communication links found in the systems described in the prior art. Many such systems require that the system operator provide update information to each individual fuel controller in order to maintain the full operation of the system. Other systems require such frequent sharing of central controller resources that actual delivery of fuel can be delayed or drawn out significantly while a fuel dispensing controller seeks access to the central control system. In addition, few if any of the fueling systems in the prior art incorporate the feature of monitoring fuel storage tank level as a means for verifying and further managing the fuel inventory at the fueling depot. Comparing transactional data from the fuel delivery system that controls the flow of fuel from the fuel storage tank with the actual level of fuel within the fuel storage tank, can provide significant information about the accuracy of the fuel delivery system and the environmental condition of the fuel storage tank.

It would be desirable therefore, to have a fuel control system that permits the automated monitoring and control of vehicle fleet fueling activity without many of the problems associated with the prior art systems. It would be desirable for such a fuel control system to be capable of operation even when communication links between the components of the system fail or otherwise delay the relay of information. It would be preferable for such a system to permit the valid delivery of fuel to a vehicle from a fuel pump through a control device, even when the control device is not in direct communication with a centralized processor. It would preferable if such a system could not only permit the independent identification of a valid transaction but also retain transactional data at a remote site or in a remote location for later access and downloading into the central processing unit.

SUMMARY OF THE INVENTION

It is therefore an object of the present invention to provide a fuel delivery control system capable of automatically monitoring and controlling the delivery of fuel to a fleet of vehicles.

It is a further object of the present invention to provide a fuel delivery control system that incorporates fuel inventory monitoring, fuel delivery validation, and management of transactional data.

It is a further object of the present invention to provide a fuel delivery control system having multiple levels of control and data storage such that the failure of a communication link between any two levels of control and data storage does not jeopardize the operation of the system and the continued valid delivery of fuel.

It is a further object of the present invention to provide a fuel delivery control system wherein each level of control and data storage is capable of independently identifying a valid fuel transaction and storing information and data related to a completed transaction.

It is a further object of the present invention to provide a fuel delivery control system capable of measuring not only fuel dispensed into vehicles as appropriate, but also fuel storage levels as a means for determining if leakage might be occurring within the system.

It is a further object of the present invention to provide a method for the operation of a fuel control system that provides the components within the system greater flexibility in the handling of information between the users and the system components. It is an object to provide alternative mechanisms for the transfer of information between control and information storage components within the system.

It is a further object of the present invention to provide a fuel control system that permits updating information and data at every level of the system from a single remote location.

In fulfillment of these and other objectives the present invention provides a fuel control system for the automated monitoring and delivery of fuel to vehicles. The complete system consists of at least three levels of control and information storage. Each vehicle/operator utilizing the system carries a read/write key that stores information about the vehicle and its fuel requirements. The vehicle key is capable of itself retaining transactional data on a temporary basis. The vehicle key is designed to be received by a fuel delivery control device positioned in conjunction with an individual fuel pump. The control device itself is capable of independently validating a fuel transaction requested by the insertion of the vehicle key. The control device is also capable of independently maintaining transactional data as well as key parameter data intended to be downloaded to the vehicle key on a regular basis. A central control unit is connected to a number of fuel delivery control devices and is designed to gather transactional data from each of the control devices as well as communicate updated information to the devices to facilitate their independent operation. In an alternative embodiment, a fourth level of control and information storage is provided by way of a telecommunications link between a number of central control units and a master management system. Operational algorithms within each component of the system permit not the only the independent operation of the system components when communication links between the components fail, but also permit alternative means for the transfer of such information between components when primary communication links fail or become inadequate. Transfer keys are provided for relaying information from each control device to the central control units and vice versa. Fuel storage tank sensors provide additional information to the central control unit about fuel inventory and permit a comparison with fuel delivery totals for the purposes of maintaining accurate inventory and detecting environmental leakage.

The above summary of the invention outlines in general terms the more important features of the present invention in order to facilitate an understanding of the invention as it may be derived from the following detailed description. Additional features of the invention are described below and form the subject matter of the claims that follow therefrom. It is understood that the invention is not limited in its application to the specific structures and arrangements of components or the specific methods as set forth herein or as illustrated in the drawings. The present invention is capable of a variety of embodiments carried out according to the overall approach described. In addition, the terms and measurements described herein are for the purpose of illustration and should not be regarded as limiting. Those skilled in the art will, on a reading of the disclosure that follows, anticipate a variety other structures and methods that have the present invention as a basis for design. The claims that follow therefore should be read as to include such equivalent constructions insofar as they do not depart from the spirit and scope of the present invention.

DESCRIPTION OF THE PREFERRED EMBODIMENT

The following is a description of the preferred embodiment of the present invention especially as it might be used in conjunction with a typical motor vehicle fueling depot. It is understood that, though described in conjunction with a vehicle fueling depot, the features of the present invention, both its methods and devices, lend themselves to use in conjunction with other types of dispensing systems. In any environment where the accurate control and monitoring of the delivery of a liquid or gaseous material is required, the present invention has application.

Figure 1:
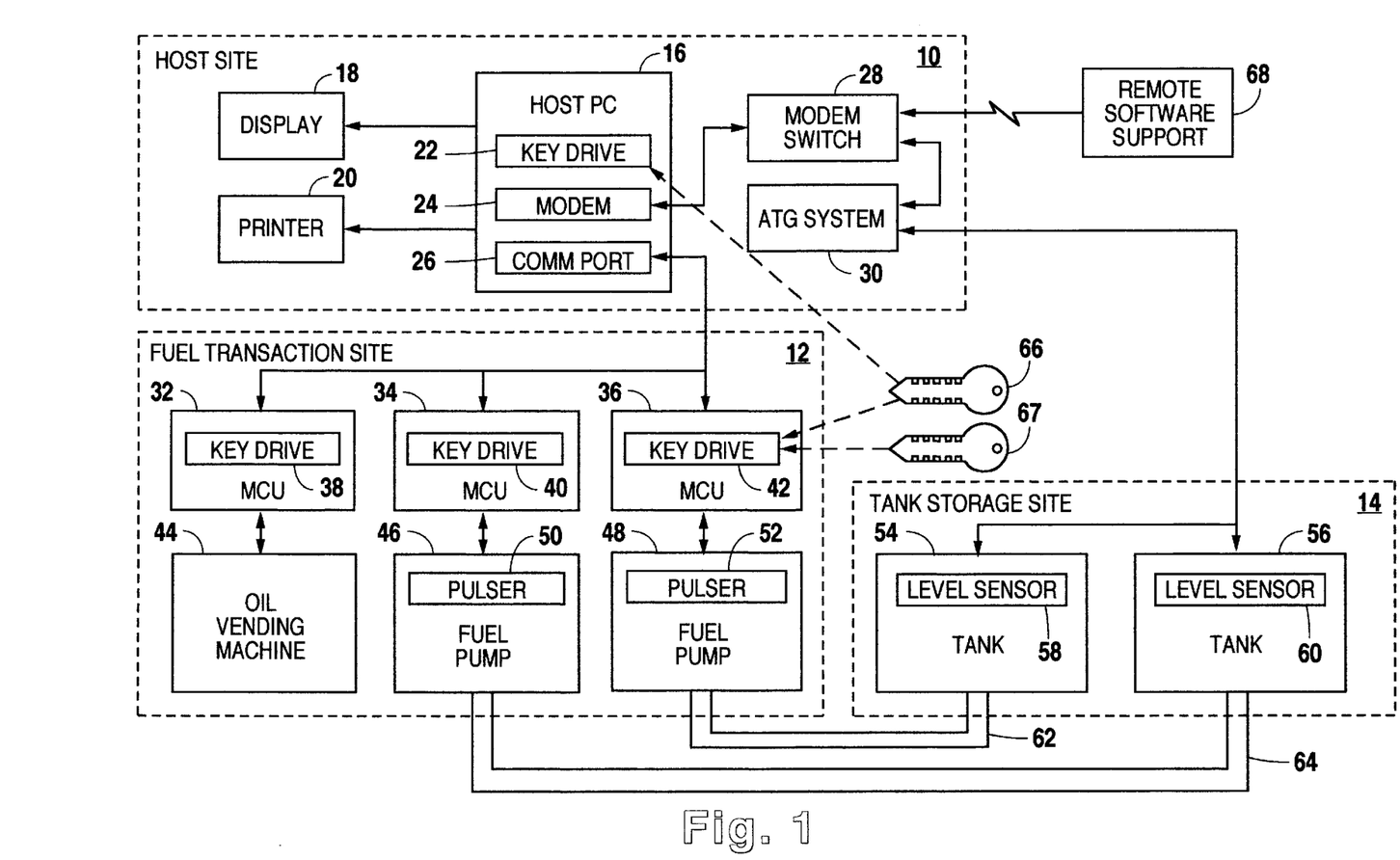
FIG. 1 is a schematic diagram showing the basic components of the complete system of the present invention.

Reference is made first to FIG. 1 for a description of the basic components of the present invention and the operation of those components for the accurate control and management of fuel delivery. The basic installation of the system of the present invention incorporates three main groups of components. A single fueling depot will typically involve a host site (10), a fuel transaction site (12), and a tank storage site (14). Host site (10) provides components which control and maintain data from a number of fuel transaction sites (12). Typically, host site (10) is established within a centralized building located at the fueling depot. Host site (10) is connected to remote software support facility (68) by means of a telecommunications link.

Fuel transaction sites (12) may each typically involve a single fueling island at the fueling depot. As described in more detail below, fuel transaction site (12) involves a number of independent fuel pumps and control devices accessible by a vehicle operator/user. In addition to host site (10) and fuel transaction site (12), the present invention incorporates a link to tank storage site (14) for the purposes of improving overall fuel inventory management.

The system in host site (10) is comprised primarily of host PC (16), which itself incorporates key drive (22), modem (24), and communications port (26). Host PC (16) operates with display (18) and printer (20). Host PC (16) serves as the primary data management computer for the system. It receives and transmits information to fuel transaction site (12) by way of communications port (26). In the preferred embodiment, communications port (26) is a standard serial port connection. Host PC (16) communicates with tank storage site (14) by way of modem (24) operable through modem switch (28) and automated tank gauge (ATG) communications system (30). Modem switch (28) serves to switch connections between remote software support (68) and ATG system (30) as the needs of the system require. ATG communications system (30) is an independent data and signal processor that permits the automated direct monitoring of storage tank levels. As described below, ATG system (30) collects and provides information to host PC (16) on instant fluid levels, weekly level histories, 30-day inventory history, and automatic leak test results. In addition, the ATG system provides alarms for overfill, low level, water, and leakage conditions.

Fuel transaction site (12) is comprised of a number of individual fuel pump stations or other devices for vending fuel or fluids to the vehicle user. In the embodiment shown in FIG. 1, fuel transaction site (12) comprises fuel pump (46), fuel pump (48), and oil vending machine (44). Each of these devices is connected to a micro-controller unit (MCU) as indicated. MCU (36) is connected to fuel pump (48), MCU (34) is connected to fuel pump (46), and MCU (32) is connected to oil vending machine (44). MCU's (32), (34), and (36) each incorporate key drives (38), (40), and (42), respectively. Fuel pumps (46) and (48) each incorporate industry standard pulsers (50) and (52).

Tank storage site (14) is comprised primarily of tanks (54) and (56), each with level sensors (58) and (60), respectively. Tanks (54) and (56) are connected to fuel pumps (46) and (48) by way of fuel lines (62) and (64).

One mobile component of the present invention is transfer key (66) which under conditions described in more detail below, can operate to communicate information from MCU's (32), (34) and (36) back to host PC (16). Also operable in conjunction with the system shown in FIG. 1 is vehicle key (67) similar in structure to transfer key (66) but primarily operable to activate the dispensing of fuel.

FIG. 1 shows in schematic form the basic components of the present invention. It is understood however, that a system incorporating the present invention could include any of a number of individual components similar to those disclosed in FIG. 1. In other words, fuel transaction site (12) may quite easily incorporate additional combinations of fuel pumps and MCU devices. The serial communications protocol defined by the system permits any number of devices to be linked to communications port (26) or host PC (16). Such devices could be grouped on individual islands or could be isolated. Likewise, there could be more than one tank storage site (14) located in conjunction a single fuel depot. ATG system (30) is capable of handling sensor inputs from a plurality of tank storage sites (14) and communicating them to host PC (16). The schematic arrangement shown in FIG. 1 does, however, provide an understanding of the connections between the various components in the present system and their operation.

Carrying out the method of the present invention starts with the arrival of a vehicle/operator at a fuel pump for fuel delivery. The vehicle operator inserts vehicle key (67) into key drive (42) of MCU (36) (as an example) connected to fuel pump (48). A number of verification and validation functions occur upon insertion of vehicle key (67) into key drive (42). These functions are described in more detail below. These validation procedures can occur entirely at MCU (36) or may involve a communication of information back to host PC (16).

A number of conditions may exist in association with the information contained on the vehicle key that would trigger the upload of information from the vehicle key or the download of revised key parameters to the vehicle key. In addition to this exchange of information, when appropriate, the vehicle key identification data provides the basis for validating the transaction of fuel being requested.

Once a transaction has been approved, MCU (36) activates fuel pump (48) to permit the flow of fuel into the vehicle according to standard fuel pump valves, nozzles, etc. Pulser (52), which is installed on fuel pump (48), is an industry standard pulser that detects, measures, and tracks the flow of fuel from fuel pump (48) into the vehicle. MCU (36) is designed to obtain the information regarding the flow of fuel by receiving output signals directly from pulser (52) in a manner well known in the art.

The information gathered about the fueling transaction may be maintained either in MCU (36) or relayed back to host PC (16) by way of the communications link between the two devices. In the event of the failure of the communications link back to host PC (16), and/or the inability of MCU (36) to fully store the transactional data, the information regarding the fueling transaction may be stored on vehicle key (67) itself for later retrieval. One of the initial activities carried out by the present invention upon insertion of vehicle key (67) into an MCU is the detection of such retained transactional data that needs to be uploaded.

It can also be seen from FIG. 1 that the failure of any individual MCU device does not inhibit the operation of the remaining MCU devices associated with fuel transaction site (12). Likewise, as indicated above, the failure of a communication link back to host PC (16), either of a temporary or permanent nature, does not result in the deactivation of fuel transaction site (12) or the individual operational MCU devices (32), (34) and (36). If the communications failure is temporary, MCU devices (32), (34) and (36) can retain the necessary information about transactions for a period of time until the communications link is re-established, at which time the information can be uploaded to host PC (16). If the communications failure is of greater duration, it is possible to relay the transaction data from MCUs (32), (34) and (36) to host PC (16) by way of transfer key (66). In fact, though it is not the preferable configuration, it is possible to operate the system of the present invention solely by transferring information by transfer key (66) rather than establishing a hard wire communication link between MCUs (32), (34), (36) and host PC (16). In the preferred embodiment, transfer key (66) is a back-up option for maintaining the operation of the system when a communication link fails.

Figure 2:
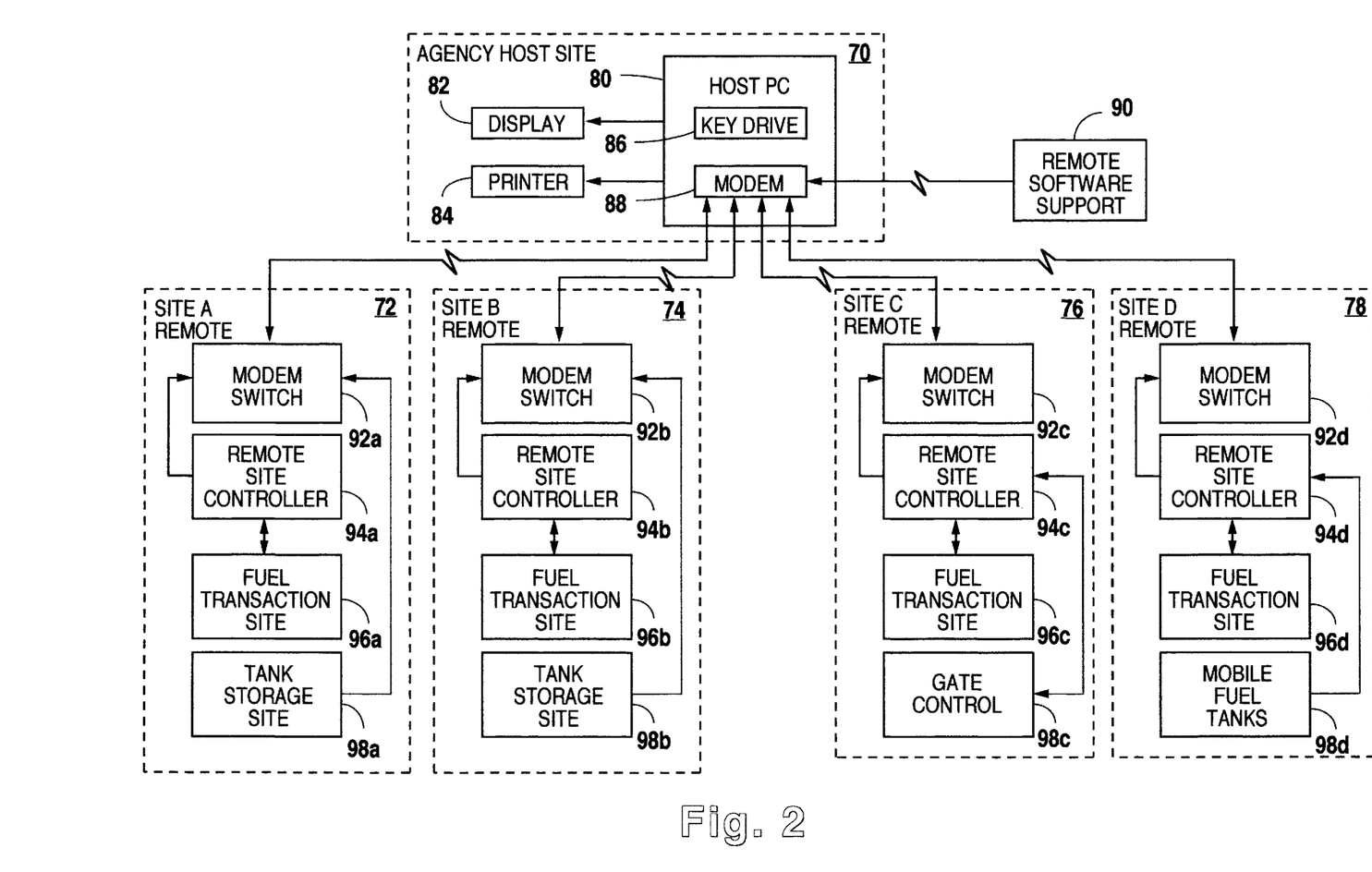
FIG. 2 is a schematic block diagram showing the components of a plurality of remote sites in conjunction with a single agency host site of the present invention.

Reference is now made to FIG. 2 for a description of yet another level of operational management incorporated into the system of the present invention. FIG. 2 discloses a plurality of remote sites operable in the same or a similar fashion as host site (10) shown in FIG. 1. It is anticipated that for fleet fueling on a larger scale the additional level of information management would be desired. Many businesses might operate a number of individual fueling depots for their fleet of vehicles and would prefer to link all such fueling depots together under one information management system. FIG. 2 discloses in detail the structure of such a system. Remote site A (72), remote site B (74), remote site C (76), and remote site D (78) are each connected to agency host site (70) by way of telecommunication links as shown. Agency host site (70) is similar in some respects to host site (10) disclosed in FIG. 1. Agency host site (70) incorporates host PC (80) which itself includes key drive (86) and modem (88). Host PC (80) operates in conjunction with display (82) and printer (84). As before, host PC (80) is capable of communicating with remote software support (90) by way of a telecommunications link through modem (88). Remote software support (90) is simply a remote system for updating the operational software of the present invention for optimizing the system.

Each remote site (72), (74), (76) and (78) is structured in much the same manner as is disclosed in FIG. 1. The combination of the remote site controller and the modem switch disclosed in each remote site shown in FIG. 2 is the equivalent of host site (10) in FIG. 1. The fuel transaction site and tank storage site correspond to the same elements in FIG. 1. Remote site A (72) is for example a standard unleaded gasoline and/or diesel fuel station and incorporates tank storage site (98a), as well as fuel transaction site (96a), remote site controller (94a), and modem switch (92a). Remote site B (74) may for example be an LP gas delivery depot that includes tank storage site (98b), fuel transaction site (96b), remote site controller (94b), and modem switch (92b). Remote site D (78) may for example be a mobile fuel tank truck for delivery of fuel products in the field. Remote site D (78) includes mobile fuel tanks (98d), fuel transaction site (96d), remote site controller (94d), and modem switch (92d). Finally, some fueling depots are operable in conjunction with a gate that controls access to the entire depot. Remote site C (76) incorporates gate control (98c) as well as fuel transaction site (96c), remote site controller (94c), and modem switch (92c).

Remote site controllers (94a) through (94d) are structured basically the same as host site (10) is structured in FIG. 1. Instead of a link to remote software support (68), however, each remote site controller (94a) through (94d) is connected through modem switch (92a) through (92d) back to host PC (80) within agency host site (70). Each remote site also includes some type of fuel transaction site (96a) through (96d) which is structured similarly to fuel transaction site (12) shown in FIG. 1. Tank storage sites (98a) and (98b) are structured as tank storage site (14) is in FIG. 1.

Modem switches (92a) through (92d) are generally associated with each remote site but may or may not be utilized in conjunction with the particular operation used as an example in FIG. 2. In other words, for remote site A (72) and remote site B (74), a modem switch is necessary in order to alternate communication between the fuel transaction site and the tank storage site in each case. On the other hand, remote site C (76) and remote site D (78) do not involve the requirement of switching between data sources for connection to agency host site (70).

Figure 3:
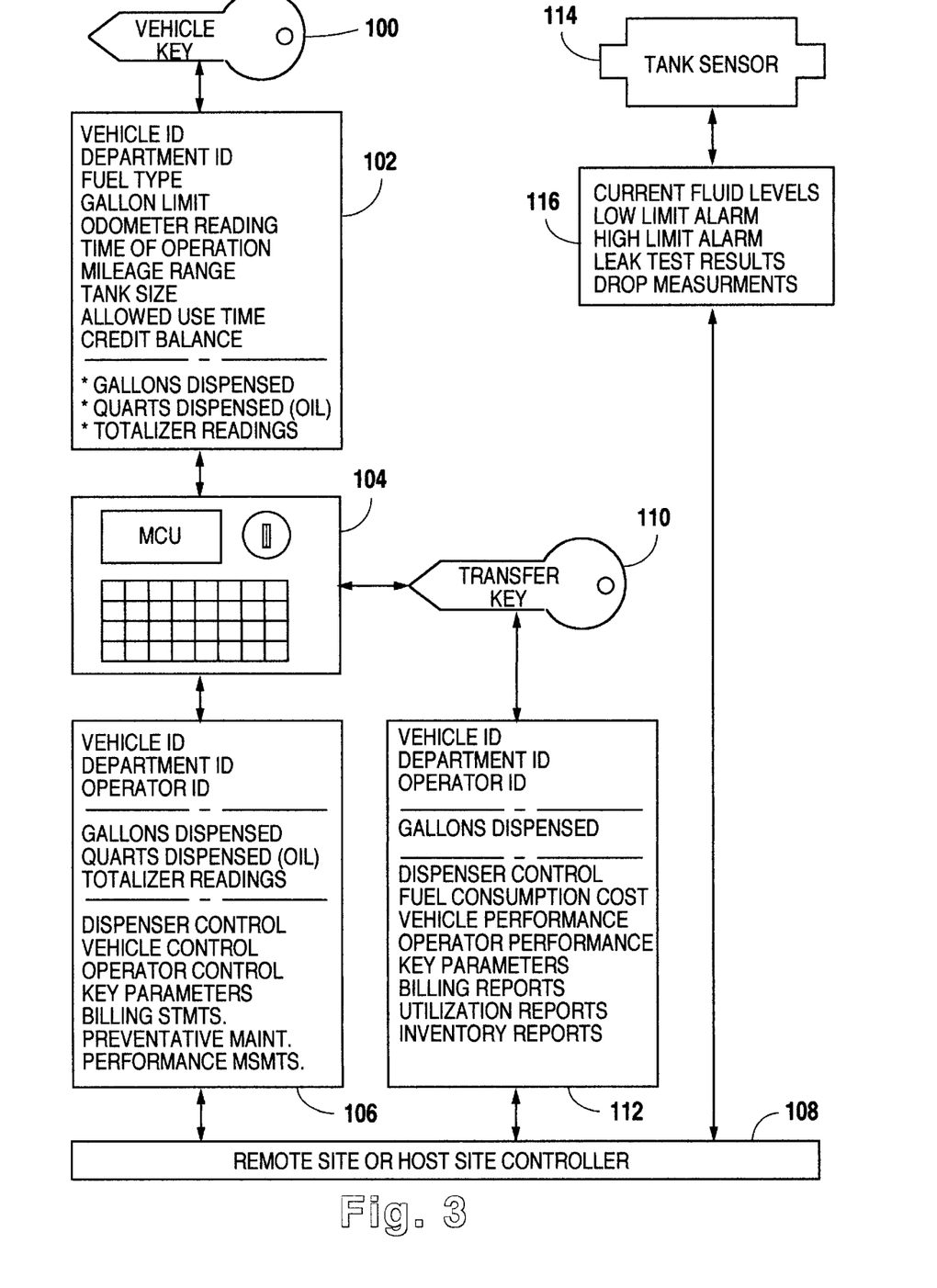
FIG. 3 is block diagram showing the basic data collection and transfer components of the present invention and the specific data communicated by each component.

Reference is now made to FIG. 3 for a general description of the type of data communicated between components of the present invention and the alternative mechanisms for transferring this data when the basic communication links fail. The standard transfer of information occurs as indicated above by the communication of validating data and transactional information from vehicle key (100) to MCU (104). The batch of information transferable between vehicle key (100) and MCU (104) includes those items contained in communication (102). This data includes vehicle ID, department ID, fuel type, gallon limit, odometer reading, time of operation, mileage range, tank size, allowed use times, and credit balance. Also included (when it is necessary to store transactional data on vehicle key (100)) are gallons dispensed, quarts dispensed (oil) and totalizer readings.

MCU (104) communicates information to remote site or host site controller (108) as indicated. Communicated information (106) includes vehicle ID, department ID, operator ID, gallons dispensed, quarts dispensed (oil), and totalizer readings. In addition, remote site or host site controller (108) provides signals back to MCU (104) to accomplish a number of functions. These include; dispenser control, vehicle control, operator control, updating key parameters, providing billing statements, preventative maintenance directions, and performance measurements.

As indicated above, when a failure occurs in the communications link between MCU (104) and remote site or host site controller (108), it is possible to transfer the necessary information between these two devices by way of transfer key (110). The information communicated (112) includes the following; vehicle ID, department ID, operator ID, and gallons dispensed. In addition, the data necessary for a number of further functions of the device may be transferred. This data includes; dispenser control, fuel consumption cost, vehicle performance, operator performance, key parameters, billing reports, utilization reports and inventory reports.

Finally, remote site or host site (108) receives communication (116) from tank sensor (114) that includes the following data; current fluid levels, low limit alarm, high limit alarm, leak test results, and drop measurements.

Figure 4:
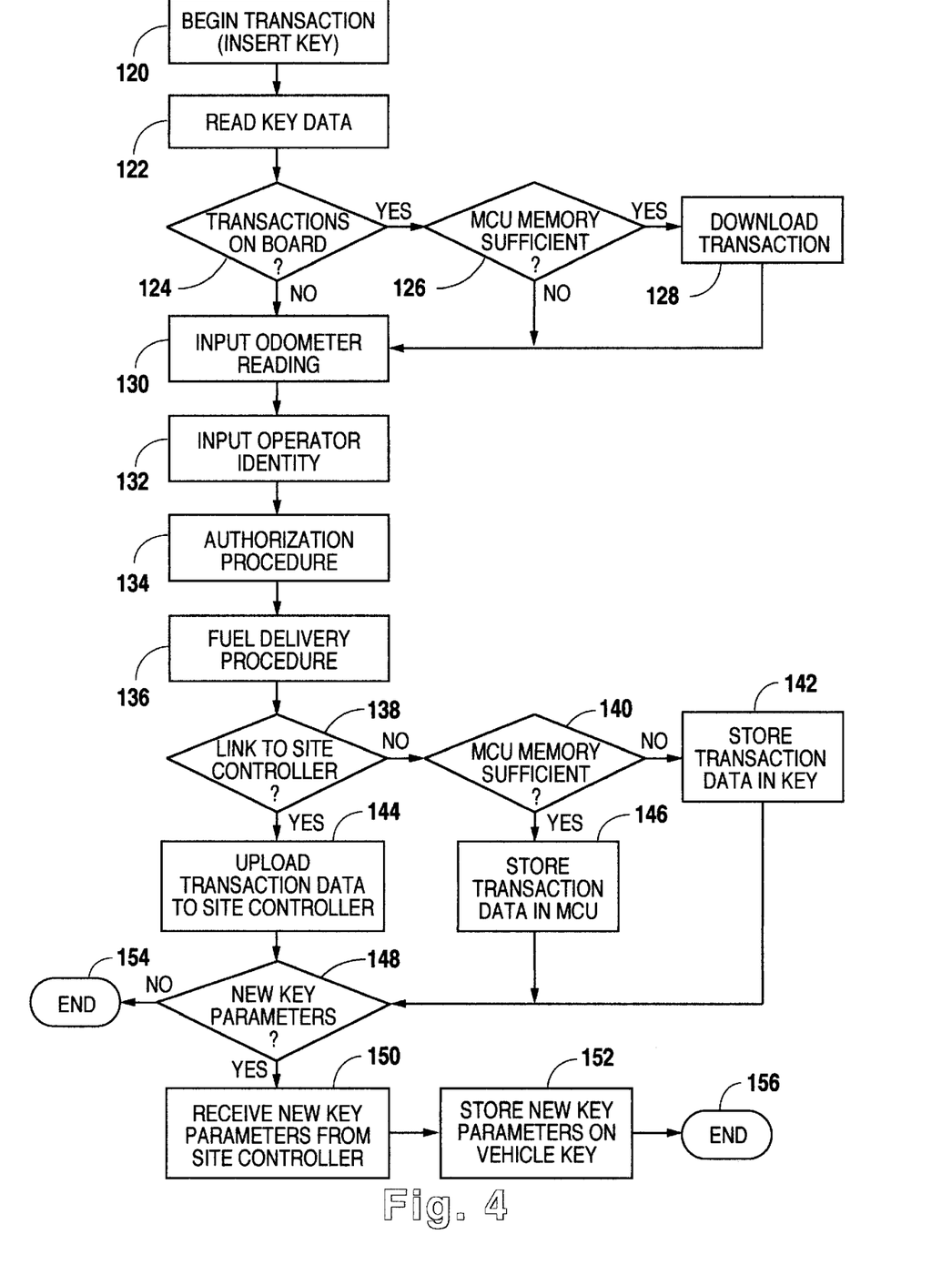
FIG. 4 is a flow chart of the fuel transaction method of the present invention.

Reference is now made to FIG. 4 for a detailed description of the method of the present invention, especially as it relates to the process of carrying out a fuel transaction. The transaction begins at step (120) with the insertion of the vehicle key into the MCU unit. The MCU unit reads the key data at step (122) and initially determines at step (124) whether any transactional data remains on board the vehicle key. If transactions are present, the MCU determines if its memory is sufficient to download these transactions at step (126). If its memory is sufficient, the MCU downloads the transaction from the vehicle key at step (128). In any event, whether a download occurs or not, the MCU then prompts the vehicle operator to input the odometer reading from the vehicle at step (130). In addition, the operator is prompted to input the operator identity at step (132). Step (134) is the authorization procedure which is described in more detail below and which results in the authorization of a fuel transaction or the denial of the fuel transaction.

Step (136) involves the fuel delivery procedure which is also described in more detail below as a separate subroutine. Once fuel delivery has occurred, the MCU determines whether there is a link to the site controller at step (138). If no link is present, either because it is in use by other devices, or because of a failure of the communications link, the MCU determines if its memory is sufficient to retain the transactional data at step (140). If it is not sufficient, the MCU is capable of directing the storage of the transactional data in the vehicle key itself at step (142). If the MCU memory is sufficient, the transactional data is stored in the MCU for later uploading to the site controller at step (146). If in fact the communications link is established to the site controller, the transactional data can be immediately uploaded to the site controller for incorporation into the balance of the management data at step (144). Upon completion of the transactional data storage, the MCU interrogates the site controller to determine if new key parameters are available for download at step (148). If not, the fuel transaction procedure terminates at step (154). If new parameters are available, the MCU receives the new key parameters from the site controller at step (150) and then stores the new key parameters on the vehicle key at step (152). The fuel transaction thereafter terminates at step (156).

Figure 5:
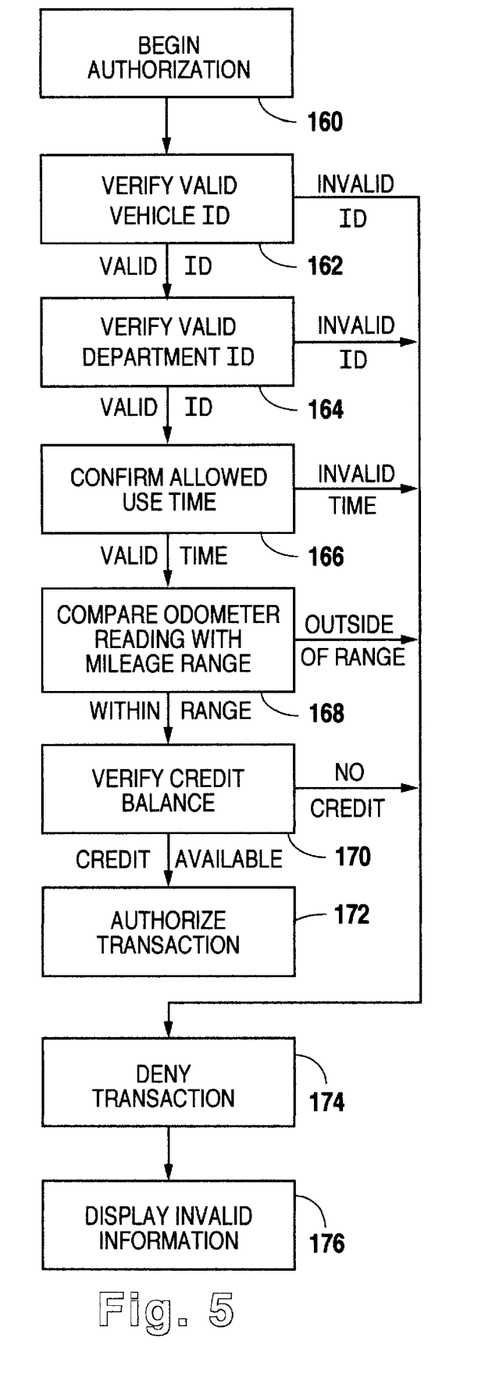
FIG. 5 is a flow chart of the authorization method of the present invention.

Reference is now made to FIG. 5 for a brief description of the procedures associated with authorization step (134) shown in FIG. 4. Authorization is begun at step (160) by verifying a number of parameters and information contained on the vehicle key. First, at step (164), a valid vehicle ID is verified, if invalid the transaction is denied. Second, at step (164), a valid department ID is verified. Third, at step (166), the MCU confirms that the vehicle key is being utilized at an allowed usage time. After receiving information on the odometer reading, the MCU compares the odometer reading with the mileage at step (168) to determine if an appropriate amount of mileage has been placed on the vehicle since its previous fueling. Finally, at step (170) the MCU verifies if an appropriate credit balance is available for the vehicle/operator holding the vehicle key. If so, the transaction is authorized at step (172). If any of the above conditions are not met, the transaction is denied at step (174) and the MCU displays the invalid information at step (176) to the vehicle operator.

Figure 6:
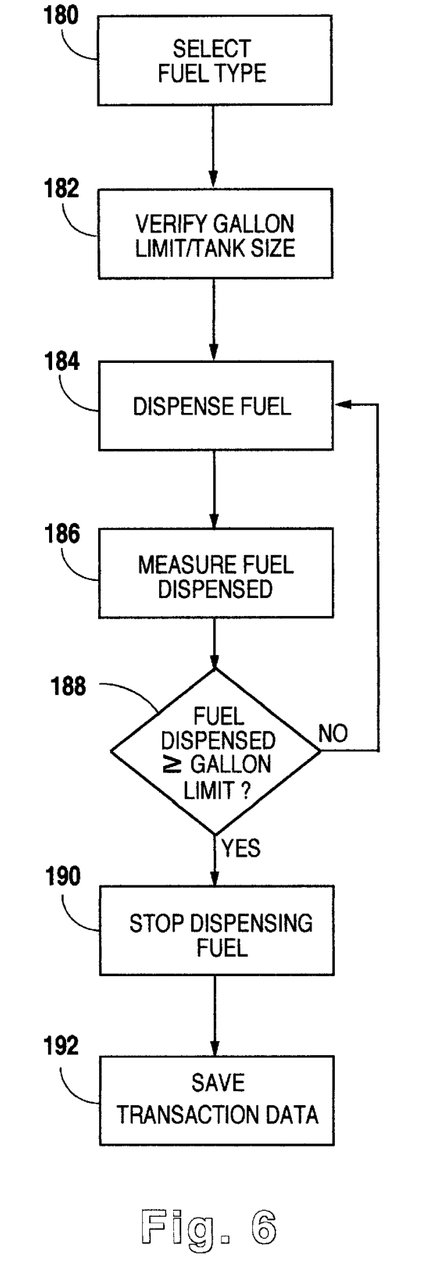
FIG. 6 is a flow chart of the fuel dispensing method of the present invention.

Reference is now made to FIG. 6 for a brief description of the fuel dispensing subroutine associated with the fuel delivery procedure step (136) shown in FIG. 4. Based upon information contained in the vehicle key, the MCU selects the fuel type at step (180) to be delivered. The MCU then verifies the gallon limit and the tank size at step (182) to establish limits on the amount of fuel to be delivered. The MCU then controls the fuel pump in order to dispense fuel at step (184) and measures the fuel being dispensed at step (186) as the procedure progresses. The MCU then determines at step (188) if the fuel dispensed is greater than or equal to the gallon limit specified for the vehicle being fueled. If not, the MCU directs the continued dispensing of fuel at step (184) through the maintenance of an open valve at the fuel pump. If the fuel dispensed is greater than or equal to the gallon limit, or if the fuel flow is otherwise deactivated for a period of time, the MCU directs the fuel pump to stop dispensing fuel at step (190). The MCU then saves the transactional data at step (192) as described in more detail above.

Figure 7:
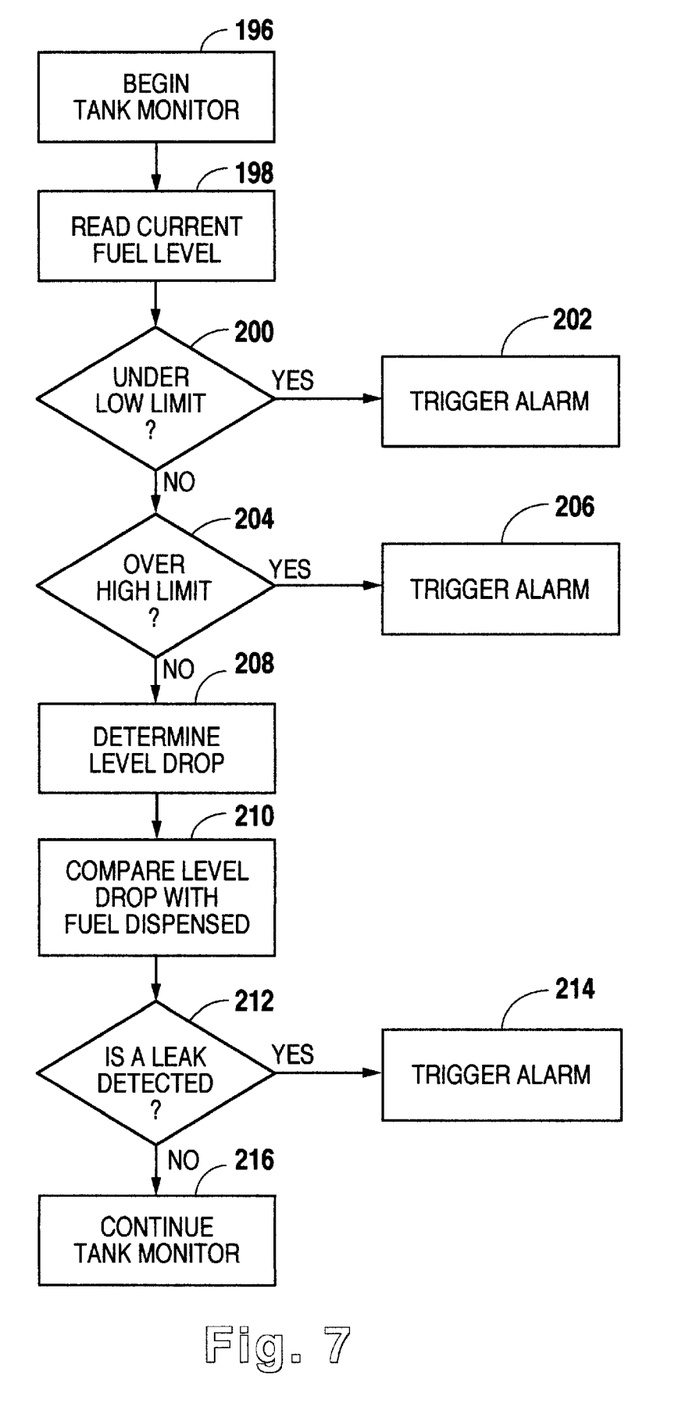
FIG. 7 is a flow chart of the tank monitoring method of the present invention.

Reference is now made to FIG. 7 for a brief description of the procedures associated with the process of monitoring the fuel storage tank associated with the system of the present invention. The tank monitoring routine is begun at step (196) and continues indefinitely as indicated. The current fuel level of the tank is read at step (198) and immediate comparisons are made to determine whether the fuel level is under the low limit for the tank at step (200). If so, an alarm is triggered and the operator is notified of this condition at step (202). If not, a comparison is made to determine if the current fuel level is over the high limit for the tank at step (204). If so, an alarm is triggered and the system operator is notified at step (206). If not, the method then proceeds to determine the level dropped since the last current fuel level reading at step (208). This level drop is compared at step (210) with quantities of fuel dispensed and measured through the fuel pumps in the balance of the system of the present invention. If there is an amount of fuel unaccounted for through the flow of fuel through the fuel pumps, a leak is inferred at step (212) from this discrepancy. If a leak is indicated, again a alarm is triggered and the system operator is notified at step (214). If no leak is detected as the result of a discrepancy between the level drop and the accumulated fuel flow, then the tank monitoring system continues at step (216) with the process of reading current fuel levels and repeating the above comparisons.

As indicated above, it can be appreciated that the fundamental components of the present invention could easily be used in conjunction with a variety of different liquid dispensing depots. The present invention has been described as it would be applied to use in conjunction with a typical fleet motor vehicle fueling depot, so as to provide accurate control of the delivery of fuel to a fleet of vehicles, as well as mechanisms for the continued operation of the depot even when components of the system fail or are otherwise not optimally operational. As indicated above, various other types of material dispensing depots could benefit from an application of the present invention. Such applications would require only slight modifications to the structures and mechanisms described and would likewise improve the efficiency and accuracy of the information management associated with such material delivery depots.

What is claimed is:

1. A system for controlling and managing the delivery of fuel to motor vehicles from at least one fuel storage tank through a plurality of fuel dispensing devices, said system comprising:

a plurality of dispensing controllers, each of said dispensing controllers operating one of said plurality of fuel dispensing devices, said dispensing controllers comprising means for storing data and means for communicating data;

a plurality of vehicle data keys insertable into said dispensing controllers, said vehicle data keys comprising means for storing data and means for communicating data;

a central microprocessor in direct data communication with each of said dispensing controllers; and at least one transfer data key insertable into said dispensing controllers and said central microprocessor said transfer data key comprising means for storing data and means for communicating data;

wherein information necessary for validation of a fueling request and information regarding a fueling transaction may be maintained in said plurality of dispensing controllers, or said plurality of vehicle data keys, or said central microprocessor.

2. A system for controlling and managing the delivery of fuel to motor vehicles from at least one fuel storage tank through a plurality of fuel dispensing devices, said system comprising:

a plurality of micro-control devices, each of said micro-control devices associated with one of said plurality of fuel dispensing devices, said micro-control devices capable of receiving information from said fuel dispensing devices regarding a quantity of fuel flowing therethrough and further capable of activating and deactivating said fuel dispensing devices to start and stop a flow of fuel therethrough, said micro-control devices further comprising means for receiving confirmation data from an operator of said vehicle;

a plurality of vehicle data keys, each of said vehicle data keys associated with one of said motor vehicles, said vehicle data keys insertable into said micro-control devices for requesting a delivery of fuel, said vehicle data keys comprising means for storing identification and fuel transaction information, said vehicle data keys further comprising means for communicating said identification and fuel transaction information to and from said micro-control devices upon insertion of said vehicle data keys therein;

a central processing unit, said central processing unit connected to each of said micro-control devices and capable of communicating data to and from said micro-control devices, said central processing unit further comprising a display and a printer;

at least one transfer data key, said transfer data key insertable into said micro-control devices and said central processing unit, said transfer data key comprising means for storing fuel transaction information and fuel management information, said transfer data key further comprising means for communicating said fuel transaction and fuel management information to and from said micro-control devices and said central processing unit upon insertion of said transfer data key therein;

at least one fuel storage tank level sensor, said level sensor connected to said central processing unit and capable of communicating data to said central processing unit regarding a level of fuel within said tank;

a remote processing unit, said remote unit for uploading said fuel transaction information and downloading said fuel management information to and from said central processing unit; and a telecommunications link between said central processing unit and said remote processing unit;

wherein insertion of one of said vehicle data keys into one of said micro-control devices initiates verification and processing of a fuel delivery request, said micro-control device confirming a validity of said request and activating a flow of fuel through one of said fuel delivery devices into said vehicle and storing information regarding said delivery of fuel.

3. A method for controlling and managing the delivery of fuel to motor vehicles from at least one fuel storage tank to a plurality of fuel dispensing devices, said method comprising the steps of:

providing a plurality of dispensing controllers for operating each of said plurality of fuel dispensing devices and having means for retaining and communicating informational data thereon;

providing a plurality of vehicle data keys insertable into said dispensing controllers and having means for retaining and communicating informational data thereon;

providing a central microprocessor in direct data communication with each of said dispensing controllers;

inserting one of said vehicle data keys into one of said dispensing controllers to request fuel delivery;

verifying said fuel delivery request;

dispensing fuel into said vehicle;

storing fueling transaction information in a memory device, said memory device comprising one of said central microprocessor, said dispensing controllers, or said vehicle data keys;

providing a transfer data key having means for retaining and communicating informational data thereon;

retrieving informational data from said dispensing controller with said transfer data key: and transferring said informational data from said transfer data key to said central microprocessor.

4. A method for controlling and managing the delivery of fuel to motor vehicles from at least one fuel storage tank to a plurality of fuel dispensing devices, said method comprising the steps of:

providing a plurality of dispensing controllers for operating each of said plurality of fuel dispensing devices and having means for retaining and communicating informational data thereon;

providing a plurality of vehicle data keys insertable into said dispensing controllers and having means for retaining and communicating informational data thereon;

providing a central microprocessor in direct data communication with each of said dispensing controllers;

inserting one of said vehicle data keys into one of said dispensing controllers to request fuel delivery;

verifying said fuel delivery request;

dispensing fuel into said vehicle;

storing fueling transaction information in a memory device said memory device comprising one of said central microprocessor, said dispensing controllers, or said vehicle data keys;

providing a transfer data key having means for retaining and communicating informational data thereon;

retrieving informational data from said central microprocessor with said transfer data key; and transferring said informational data from said transfer data key to said dispensing controller.

5. A method for controlling and managing the delivery of fuel to motor vehicles from at least one fuel storage tank through a plurality of fuel dispensing devices, said method comprising the steps of:

providing a plurality of micro-control devices, each of said micro-control devices associated with one of said plurality of fuel dispensing devices;

providing a plurality of vehicle data keys, each of said vehicle data keys associated with one of said motor vehicles, said vehicle data keys insertable into said micro-control devices and having means for retaining and communicating informational data thereon;

providing at least one fuel storage tank level sensor;

providing a central processing unit in data communication with each of said micro-control devices;

inserting one of said vehicle data keys into one of said micro-control devices to request a delivery of fuel to said vehicle;

verifying a validity of said fuel transaction request from said informational data contained on said vehicle data key;

initiating a flow of fuel through said fuel dispensing devices to said vehicle upon verification of said fuel request;

receiving information through said micro-control devices from said fuel dispensing devices regarding a quantity of fuel flowing therethrough;

terminating a flow of fuel from said fuel dispensing devices at a pre-determined level associated with a fuel capacity for said motor vehicle;

storing fueling transactional information in a memory device, said memory device comprising one of said central processing unit, said micro-control devices, or said vehicle data keys;

receiving information from said level sensor regarding a level of fuel in said storage tank;

comparing changes in said level of fuel in said storage tank over time with said fueling transactional information to identify a leak in said fuel storage tank from a discrepancy in said information;

providing a transfer data key, said transfer data key insertable into said micro-control devices and having means for retaining and communicating informational data thereon;

inserting said transfer data key into one of said micro-control devices;

transferring informational data from said micro-control device to said transfer data key;

removing said transfer data key from said micro-control device;

inserting said transfer data key into said central processing unit; and transferring informational data from said transfer data key to said central processing unit.

* * * * *